INVENTOR.
ROBERT B. LAUCK
BY
Yount and Tarolli
ATTORNEYS

__United States Patent Office__

3,572,213
Patented Mar. 23, 1971

3,572,213
HYDROSTATIC CONTROL SYSTEM
Robert B. Lauck, Southfield, Mich., assignor to Eaton Yale & Towne Inc., Cleveland, Ohio
Filed May 12, 1969, Ser. No. 823,819
Int. Cl. F15b *11/08*
U.S. Cl. 91—444                                                     5 Claims

ABSTRACT OF THE DISCLOSURE

A hydraulic control system for a vehicle includes a master control valve which is operated by a manual control to control the flow of hydraulic fluid to a fluid pressure cylinder which operates to control the swash of the hydrostatic transmission. An anti-stall control is included in the system and operates to reduce the pressure in the pressure cylinder and thereby effect a de-swash of the hydrostatic transmission when the vehicle in which the system is incorporated encounters a stall condition. The system further includes a control for slowing the increase in pressure in the pressure cylinder after the stall condition has been alleviated.

---

Figure 1:
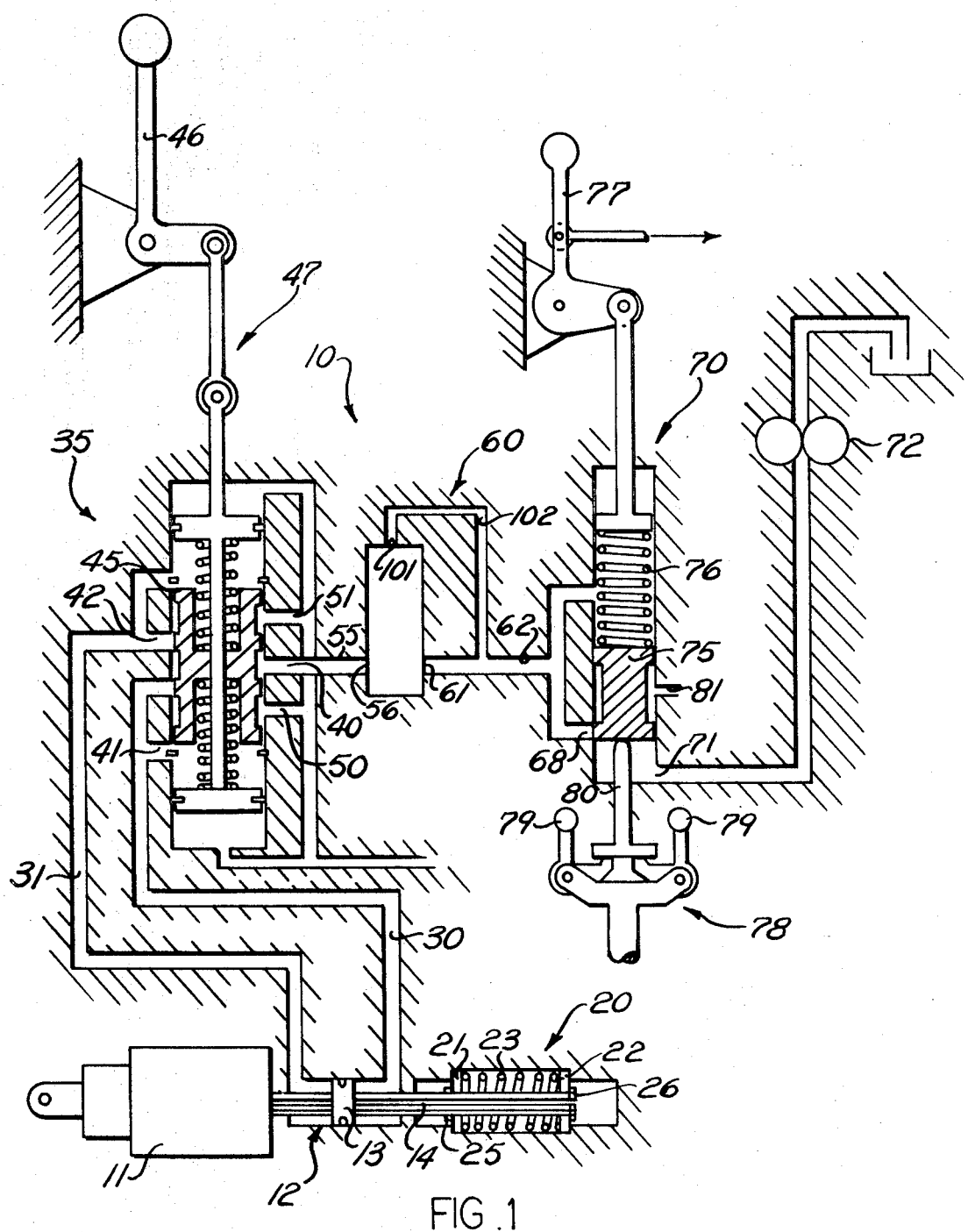

The present invention relates to a control system for a hydrostatic transmission, and particularly relates to a hydrostatic transmission control system which includes an anti-stall control.

Known hydrostatic control systems include a hydraulic control system for controlling the swash or drive ratio of the hydrostatic transmission. These hydraulic control systems include a master control valve which is operated by a manual control lever and which, in turn, controls the flow of hydraulic fluid to a pressure cylinder. The pressure cylinder then effects a change in the swash angle of the hydrostatic transmission as determined by the position of the control lever. Such systems have also included an anti-stall control device for automatically reducing the drive ratio or de-swashing the hydrostatic transmission in response to sensing that the engine of the vehicle is approaching a stall condition. An example of such a control system is disclosed in copending Lauck, Ser. No. 716,204, and assigned to the assignee of the present invention.

The above-noted control systems are utilized in connection with vehicles, such as bulldozers, tractors, and the like. In the case of such a vehicle operating to move a load, such as pushing a load over a cliff, problems have been encountered. One of the problems that is encountered is that as the vehicle approaches the cliff and the engine approaches a stall condition, the anti-stall control operates to effect a de-swashing of the hydrostatic transmission thereby reducing vehicle speed. When the load drops and the anti-stall condition is alleviated, the engine automatically speeds up. In known systems, the anti-stall control rapidly operates to re-establish the appropriate pressures in the master control for causing an up-swashing of the hydrostatic transmission. As a result of these control operations occurring, the hydrostatic transmission is rapidly up-swashed causing a rapid increase in vehicle speed. As a result, the vehicle jumps forward rapidly and can result in the operator losing control of the vehicle and could result in damage to the vehicle and injury to the operator.

Accordingly, the present invention has been devised in order to reduce the rate at which up-swashing or an increase in the drive ratio of the hydrostatic transmission is effected after an anti-stall condition has occurred. As a result of reducing the speed at which up-swashing occurs, a better or smoother control of the vehicle is effected and the problem of the vehicle jumping forward at a rapid rate is eliminated.

Accordingly, the principal object of the present invention is the provision of a new and improved control system for a hydrostatic transmission in which the up-swashing of the hydrostatic transmission after an anti-stall condition is encountered is slowed in order to prevent rapid forward movement of the vehicle due to rapid up-swashing of the hydrostatic transmission.

A further object of the present invention is the provision of a new and improved control system for a hydrostatic transmission in which a control unit is interposed between a master control valve and an anti-stall device and which control unit operates to control the rate at which pressure is built up in the master control after the anti-stall control device has vented the master control as a result of a stall condition being sensed.

A still further object of the present invention is the provision of a new and improved hydrostatic control system in which the control unit, as noted in the next to preceding paragraph, comprises a member which moves to restrict the flow of fluid to the master control valve in response to an increase in pressure applied thereto by the anti-stall control unit to thereby slow the increase or rise in pressure in the master control and thereby control or slow the up-swashing of hydrostatic transmission.

Figure 2:
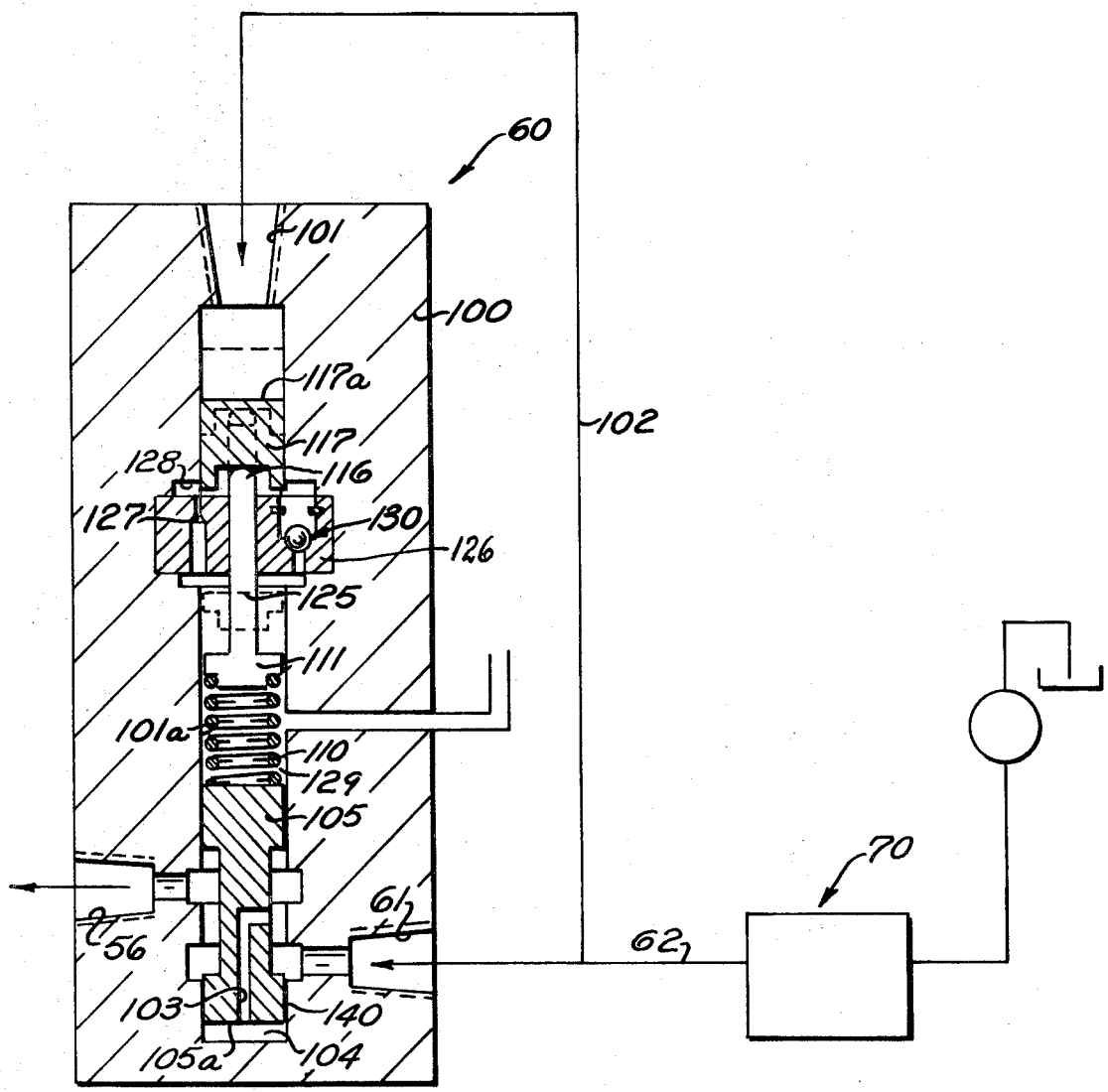

Further objects and advantages of the present invention will be apparent to those skilled in the art to which it relates from the following detailed description of a preferred embodiment thereof made with reference to the accompanying drawings and in which:

FIG. 1 is a schematic illustration of a hydrostatic control system embodying the present invention; and FIG. 2 is an enlarged view of a portion of the hydrostatic control system illustrated in FIG. 1.

In accordance wtih the present invention, an improved hydrostatic control system is provided. The improved system includes a manually controlled master control valve which controls the swash of the hydrostatic transmission, an anti-stall control which varies the swash upon the vehicle approaching a stall condition, and a control unit for controlling the rate of up-swashing of the transmission after an anti-stall condition is alleviated.

A hydrostatic control embodying the present invention can be applied to a variety of vehicles. Moreover, the system can be used where one transmission is used in the vehicle or where a plurality of transmissions are used, such as in a track vehicle where separate hydrostatic transmissions are used for driving each track. In view of the fact that the present invention can be applied to a variety of different structural arrangements, a control system 10 is shown schematically in the drawings, FIG. 1.

The control system 10 operates to control the swash of a hydrostatic transmission, not shown. The swash of the hydrostatic transmission is varied by actuation of a servomotor, as is known. The servomotor is controlled by a servocontrol valve 11. The servocontrol valve is operated by a control cylinder 12.

The control cylinder 12 includes a cylinder member in which a piston 13 is located. The piston 13 is connected to a control rod 14 which is associated in a conventional manner with the servocontrol valve 11. The rod 14 and piston 13 have a neutral position and when the piston 13 and control rod 14 move therefrom, the servocontrol valve 11 is operated to direct fluid to the servomotor to either up-swash or de-swash the hydrostatic transmission. When the piston 13 is in its neutral position, the transmission is also in neutral. As is well known, up-swashing means increasing the drive ratio of the transmission while de-swashing means decreasing the drive ratio of the transmission.

The piston 13 is biased to its neutral position by a spring box 20. The spring box 20 is associated with the piston rod 14 and may be of any suitable construction.

As illustrated, the spring box 20 includes a pair of piston members 21, 22 having a spring 23 interposed therebetween. The spring 23 biases the piston members 21, 22 against split ring members 25, 26, respectively, carried by the piston rod 14. It should be apparent that when the piston rod 14 moves in a given direction, one of the piston members 21, 22 will be moved therewith causing the spring 23 to be compressed. The spring 23, of course, urges the piston members 21, 22 to return to the illustrated neutral positions when the force moving the respective piston is removed.

The force which results in movement of the piston rod 14 in opposition to the spring 23 results from a pressure differential on the opposite sides of the piston 13. The opposite ends of the cylinder in which the piston 13 moves are connected by conduits 30, 31 to a master control valve 35. The master control valve 35 is operated to control the pressure in the conduits 30, 31 and thereby control the pressure on the opposite sides of piston 13.

The master control valve 35 may be of a variety of constructions. The master control valve 35, shown schematically in FIG. 1, is described in detail in copending application Ser. No. 716,204. For purposes of the present invention a detailed description thereof is not necessary and reference may be made to the copending application Ser. No. 716,204 for a detailed description.

The master control valve 35 includes a fluid pressure inlet 40 and a pair of outlets 41, 42 which are connected with the conduits 30, 31, respectively. The valve 35 also includes a spool valve member 45 which is movable from a neutral position, as shown in FIG. 1, upon operation of a manually operated swash control lever 46. The lever 46 is connected with the spool valve member 45 by a linkage 47.

In the event that the spool valve member 45 is moved upwardly, as illustrated in FIG. 1, the inlet 40 is communicated with conduit 31 causing a pressure buildup on the left side of piston 13 which results in movement thereof to the right. At this time, the conduit 30 is communicated with outlet 50 of the control valve 35 which is connected to drain. In the event that the spool valve member 45 is moved downwardly, as illustrated in FIG. 1, the inlet 40 is communicated with conduit 30 causing a pressure increase on the right side of piston 13 which results in movement thereof to the left. When the spool valve member 45 is moved downwardly, the conduit 31 is communicated with outlet 51 of the control valve 35 which is also connected with drain.

The inlet 40 of the master control valve 35 is connected with a conduit 55 which, in turn, is connected with the outlet 56 of a control unit 60 to be described in detail hereinbelow. The control unit 60 has an inlet 61 which is connected by a conduit 62 to the outlet 68 of an anti-stall control 70. The anti-stall control 70 has an inlet 71 which is connected with a fluid pump 72.

The anti-stall control 70 may be of any desired construction. As illustrated in FIG. 1, the anti-stall control 70 includes a valve member 75 which is movable in a valve body. The valve member has a spring 76 biasing it downwardly, as viewed in FIG. 1. The force of spring 76 is controlled by a throttle control 77. An engine speed sensor 78 acts to urge the member 75 upwardly. The sensor 78 comprises a plurality of pivoted weights 79 rotated from the engine of the vehicle. The weights 79 tend to move outwardly as engine speed increases and as a result move a plunger member 80 upwardly. The plunger member 80 thus acts tending to move the valve member 75 upwardly.

In the event that the engine is operating in a non-stall condition, the member 75 is in an upper position and the inlet 71 communicates with outlet 68 and fluid pressure is directed to the control 60. However, if the vehicle encounters a stall condition, the member 75 moves downwardly. This effects communication of the outlet 68 with an outlet 81 which is connected to drain. As a result, when an anti-stall condition is encountered, the pressure in control unit 60 is reduced, as well as the pressure in the inlet 40 of the master control valve.

When the pressure in the inlet in the master control valve reduces, the pressure differential across the piston 13 reduces, and as a result, the spring box 20 tends to return the piston 13 toward its neutral position. As a result, whether the hydrostatic transmission was in forward or reverse, the hydrostatic transmission is de-swashed. The de-swashing is effected without moving the manual control lever 46 for the master control valve 35.

It should be apparent that when the anti-stall condition has been alleviated, the engine will come up to speed. As a result, the weights 79 move plunger 80 upwardly to communicate inlet 71 with the outlet 68. Thus, fluid pressure is again directed to the master control valve 35 which directs the pressure to the piston 13. Thus, the pressure differential is re-established across the piston 13 and the transmission is up-swashed thereby increasing the speed of the vehicle.

In the event that the vehicle embodying the hydrostatic control system 10 is moving a load and the engine encounters a stall condition, the anti-stall control 70 vents the master control valve 35, causing a de-swashing of the hydrostatic transmission. In the event that the vehicle is moving a load off a hill of a cliff, or the like, as soon as the load is removed from the vehicle, the stall condition is alleviated. The anti-stall control 70 thus will direct fluid pressure back to the master control valve 35 in a rapid manner, the up-swash of the hydrostatic transmission will be effected rapidly causing a rapid increase in the vehicle speed. This rapid increase in the vehicle speed may cause the vehicle operator to lose control of the vehicle and result in injury to the operator and possible damage to the vehicle.

In accordance with the present invention, the control unit 60 is provided for controlling the speed at which the pressure is increased in the master control valve 35 after an anti-stall condition has been alleviated. The control unit 60 comprises a body 100 which has the inlet 61 and outlet 62 therein. The pressure which is applied at the inlet 61 of the body 100 is also applied to an inlet 101 thereof by a fluid conduit 102.

The body 100 includes a central bore or passageway 101a in which a piston member 105 is located. The piston member 105 has a passageway 103 therein and the fluid pressure which is directed into the inlet 61 is directed through the passageway 103 to a chamber 104 located at the bottom end, as viewed in FIG. 2, of the body 100. Accordingly, any pressure in the chamber 104 acts to move the piston 105 in an upward direction.

A spring 110 is interposed between the piston 105 and a second piston member 111. The second piston member 111 has an end portion 116 which engages a movable member 117. The movable member 117 has a surface 117a against which the pressure from the inlet 101 acts.

The piston member 111 has a projecting portion 125 which extends through a member 126 located in the bore 101a. The member 126 has a fluid passageway or orifice 127 therein communicating the opposite sides thereof. In effect, the passageway 127 provides for fluid communication between a chamber 128 defined in part by the member 117 and the member 126 with a chamber 129 in which the spring 110 acts. The member 126 also has a check valve of the ball type, generally designated 130, therein which also, when opened, provides for fluid communication between the chambers 128, 129. The chamber 129, as illustrated in FIG. 2, is in fluid communication with a supply of hydraulic fluid.

As noted above, the control unit 60 will slow down the increase in pressure in the master control valve 35 when a stall condition has been alleviated. As shown in full lines in FIG. 2, the member 117 is illustrated in its normal operating position. When in its normal position, the pressure acting on the surface 117a thereof is the same as the pressure which is acting against the piston member 105 urging it into an upward direction. The area of the surface 117a is preferably slightly greater than the area of the surface 105a of the piston 105. Moreover, the spring 110 is applying equal and opposite forces to the member 117 and the member 105. The member 105 provides for fluid communication between the inlet 61 and outlet 56 in this position and as a result, fluid can freely be directed into the master control valve 35.

In the event, however, of a stall condition occurring, the pressure in the inlet 61 and the inlet 101 reduces because of the movement of piston 75 to a position whereat conduits 62, 68 and 102 are communicated to drain through conduit 81. Upon reduction of fluid pressure at inlet 61 and inlet 101, the piston 117 is moved upwardly under the influence of spring 110 to a position shown in phantom in FIG. 2. The piston member 105 tends to move slightly, if at all. Thus, a reduction in pressure in the outlet 68 of the anti-stall control 70 will be transmitted to the master control valve.

When the member 117 moves upwardly, fluid pressure is drawn into the chamber 129 from the supply and through the ball check valve into the chamber 128. The ball check valve 130, of course, opens due to the fact that when the member 117 moves upwardly the pressure in chamber 128 reduces.

When the stall condition is alleviated, as described above, the anti-stall control 70 immediately increases the pressure in the inlets 61, 101 of the control 60. As a result of the rapid increase in pressure in the inlets 61, 101, there is a rapid increase in the pressure acting on the surface 117a of the member 117 and there is a rapid increase in the pressure acting on the surface 105a of the member 105.

The increase in pressure on the surface 117a of the member 117 attempts to move the member 117 downwardly against the pressure of the fluid in the chamber 128. The ball check valve 130 is closed by any tendency of the member 117 to move downwardly and the pressure in the chamber 128 is increased. This increase in pressure in the chamber 128 is transmitted through the orifice 127 to the chamber 129. However, the pressure in the chamber 129 due to the operation of the orifice 127 cannot increase rapidly and, in fact, there is a time delay in the increase in the pressure in the chamber 129. Due to the fact that the pressure in the chamber 129 is not increased as rapidly as the pressure acting on the surface 105a increases, the piston member 105 will move upwardly and block off or restrict communication between the inlet 61 and the outlet 56.

When the member 105 moves upwardly, the land 140 thereon partially covers the inlet 61 and restricts communication between the inlet 61 and the outlet 56. As the pressure, however, in chamber 129 increases, the member 105 will move downwardly in order to provide a greater area of communication between the inlet 61 and the outlet 56. Thus, the member 105 temporarily restricts fluid flow to the master control valve 35.

It should be apparent from the above description that the member 105, when an anti-stall condition has been alleviated, will move upwardly to restrict communication between the inlet 61 and the outlet 56 of the control 60. The member then moves downwardly as the pressure in the chamber 129 increases. As a result, the member 105 shows the pressure increase in the master control valve 35 when an anti-stall condition has been alleviated. As described above, this has the advantage of preventing possible rapid forward movement of the vehicle and minimizes the possibility of injury to the operator and damage to the vehicle.

Having described my invention, I claim:

1. A control system for controlling the swash of a hydrostatic transmission of a vehicle comprising a fluid pressure cylinder operable to vary the swash of the hydrostatic transmission, an anti-stall control operable to reduce the pressure in said pressure cylinder in response to the vehicle encountering a stall condition to de-swash the hydrostatic transmission and operable to increase the pressure in said pressure cylinder in response to alleviation of the stall condition, and control means including a body having an inlet in communication with said anti-stall control and an outlet in communication with said pressure cylinder, and a member movable in response to an increase in pressure in said inlet to temporarily block the communication between said inlet and said outlet.

2. A control system as defined in claim 1 wherein said member has the fluid pressure of said inlet acting on one end thereof tending to move said member in one direction and has a spring and a fluid pressure acting in conjunction with said spring to resist movement of said member to block communication between said inlet and said outlet.

3. A control system for controlling the swash of a hydrostatic transmission of a vehicle comprising a fluid pressure cylinder operable to vary the swash of the hydrostatic transmission, a master control valve connected to the pressure cylinder to control the pressure therein, an anti-stall control means associated with said master control valve and operable to reduce the pressure in said pressure cylinder in response to the vehicle encountering a stall condition to de-swash the hydrostatic transmission and operable to increase the pressure in said pressure cylinder in reponse to alleviation of the stall condition, and fluid control means including a body member having a pair of inlets communicating with said anti-stall control means and an outlet for communication with one of said inlets and with said master control valve, said body having a bore therein, a pair of members located in said bore and a spring biasing said members apart, the fluid pressure at one inlet acting on one member and the fluid pressure at the other inlet acting on the other member urging said members together, means interposed between said other member and said spring dividing said bore into two chambers, said other member being movable to increase the pressure in the one chamber adjacent thereto upon an increase in pressure in the inlet associated therewith, and means for effecting a slow increase in pressure in said other chamber as a result of an increase in pressure in said one chamber whereby said one member moves toward the other member to limit communication between said one inlet and said outlet.

4. A control system as defined in claim 3 wherein said means for effecting a slow increase in the pressure in said other chamber comprises an orifice effecting fluid communication between said chamber.

5. A control system as defined in claim 3 wherein upon a reduction in pressure at said inlets said other member moves to reduce the pressure in said one chamber, and a valve communicating said one chamber and said other chamber and providing for rapid flow therebetween upon a reduction in the pressure in said one chamber.

References Cited
UNITED STATES PATENTS 3,003,309  10/1961  Bowers et al. _____ 60—19
3,213,617  10/1965  Hallberg _____ 60—53
3,272,278  9/1966  Budzich _____ 60—19X EDGAR W. GEOGHEGAN, Primary Examiner U.S. Cl. X.R.

60—52(VS), 52(S.R.), 53